United States Patent
Donnelly et al.

(10) Patent No.: US 8,554,496 B2
(45) Date of Patent: Oct. 8, 2013

(54) WATER CONSUMPTION MONITOR

(75) Inventors: Ian Abbott Donnelly, Stamford (GB); Youssef Drissi, Ossining, NY (US); Tyrone W. Grandison, San Jose, CA (US); Colin G. Harrison, Brookfield, CT (US); Kaan K. Katircioglu, Yorktown Heights, NY (US); Jurij R. Paraszczak, Pleasantville, NC (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 12/843,358

(22) Filed: Jul. 26, 2010

(65) Prior Publication Data

US 2012/0022803 A1 Jan. 26, 2012

(51) Int. Cl.
*G01N 11/00* (2006.01)
*G10F 1/00* (2006.01)
*G01F 7/00* (2006.01)
*G01F 17/00* (2006.01)
*G01F 23/00* (2006.01)
*G01L 7/00* (2006.01)

(52) U.S. Cl.
USPC .................................. 702/45; 702/50; 702/55

(58) Field of Classification Search
USPC .......................................... 702/49, 45, 50, 55
See application file for complete search history.

(56) References Cited

U.S. PATENT DOCUMENTS

| | | | |
|---|---|---|---|
| 4,767,922 A | 8/1988 | Stauffer | |
| 5,025,516 A | 6/1991 | Wilson | |
| 5,577,660 A | 11/1996 | Hansen | |
| 5,865,871 A | 2/1999 | Simundich | |
| 5,918,855 A | 7/1999 | Hamanaka et al. | |
| 6,126,290 A | 10/2000 | Veigel | |
| 6,516,249 B1 * | 2/2003 | Hoyle et al. | 700/282 |
| 6,895,985 B2 | 5/2005 | Popper et al. | |
| 7,392,552 B2 | 7/2008 | Lu | |
| 2002/0019709 A1 * | 2/2002 | Segal | 702/45 |
| 2004/0025248 A1 * | 2/2004 | Lang et al. | 4/623 |
| 2004/0258567 A1 | 12/2004 | Kokin et al. | |
| 2005/0171709 A1 * | 8/2005 | Nortier et al. | 702/45 |
| 2005/0199841 A1 * | 9/2005 | O'Maley et al. | 251/129.04 |
| 2006/0138246 A1 * | 6/2006 | Stowe et al. | 236/12.12 |
| 2007/0204925 A1 * | 9/2007 | Bolderheij et al. | 137/801 |
| 2009/0307116 A1 | 12/2009 | Al-Harbi | |
| 2010/0108165 A1 * | 5/2010 | Rodenbeck et al. | 137/801 |
| 2011/0139282 A1 * | 6/2011 | Loeck et al. | 137/801 |

\* cited by examiner

*Primary Examiner* — Alexander H Taningco
*Assistant Examiner* — Manuel Rivera Vargas
(74) *Attorney, Agent, or Firm* — Jeffrey N. Giunta; Fleit Gibbons Gutman Bongini & Bianco PL

(57) ABSTRACT

A system and method for monitoring utilization and waste of a natural resource, such as water. Data is received indicating natural resource consumption by a facility. An indication of at least one period of natural resource usage by the facility is received. Natural resource usage corresponding to utilization of the natural resource for a useful purpose. Quantities of the natural resource consumed by the facility during the at least one period of water usage is recorded as a utilized quantity.

17 Claims, 5 Drawing Sheets

WATER CONSUMPTION MONITOR

FIELD OF THE INVENTION

The present invention generally relates to monitoring consumption of natural resources and more particularly to instrumentation that monitors usage of consumed fluid.

BACKGROUND OF THE INVENTION

Many factors are increasing the importance of conserving natural resources. For example, clean water is becoming a more precious commodity as population grows and clean water supplies are becoming more strained. In order to reduce resource consumption, conservation measures including equipment modification and conservation incentives are provided to users of resources. Development of more effective resource conservation strategies can be assisted by accurate evaluation of the effectiveness of current conservation techniques.

Therefore, developing effective resource conservation measures is enhanced by monitoring the effectiveness of current natural resource utilization levels.

SUMMARY OF THE INVENTION

In one embodiment, a method for monitoring natural resource utilization is performed with a processor and includes receiving data indicating water consumption by a facility. At least one period of water usage by the facility is detected, where the water usage corresponds to utilization of water for a useful purpose. A utilized quantity is recorded corresponding to quantities of water consumed by the facility during the at least one period of water usage.

In another embodiment, a system for monitoring natural resource utilization includes a memory and a processor communicatively coupled to the memory. The processor includes an instruction processor that receives data indicating water consumption by a facility and detects at least one period of water usage by the facility. The water usage corresponds to utilization of water for a useful purpose. The instruction processor further records, as a utilized quantity, quantities of water consumed by the facility during the at least one period of water usage.

In another embodiment, a computer program product for monitoring natural resource includes a storage medium readable by a processing circuit and storing instructions for execution by the processing circuit for performing a method. The method includes receiving data indicating water consumption by a facility and detecting at least one period of water usage by the facility. The water usage corresponding to utilization of water for a useful purpose. The method further includes recording, as a utilized quantity, quantities of water consumed by the facility during the at least one period of water usage.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
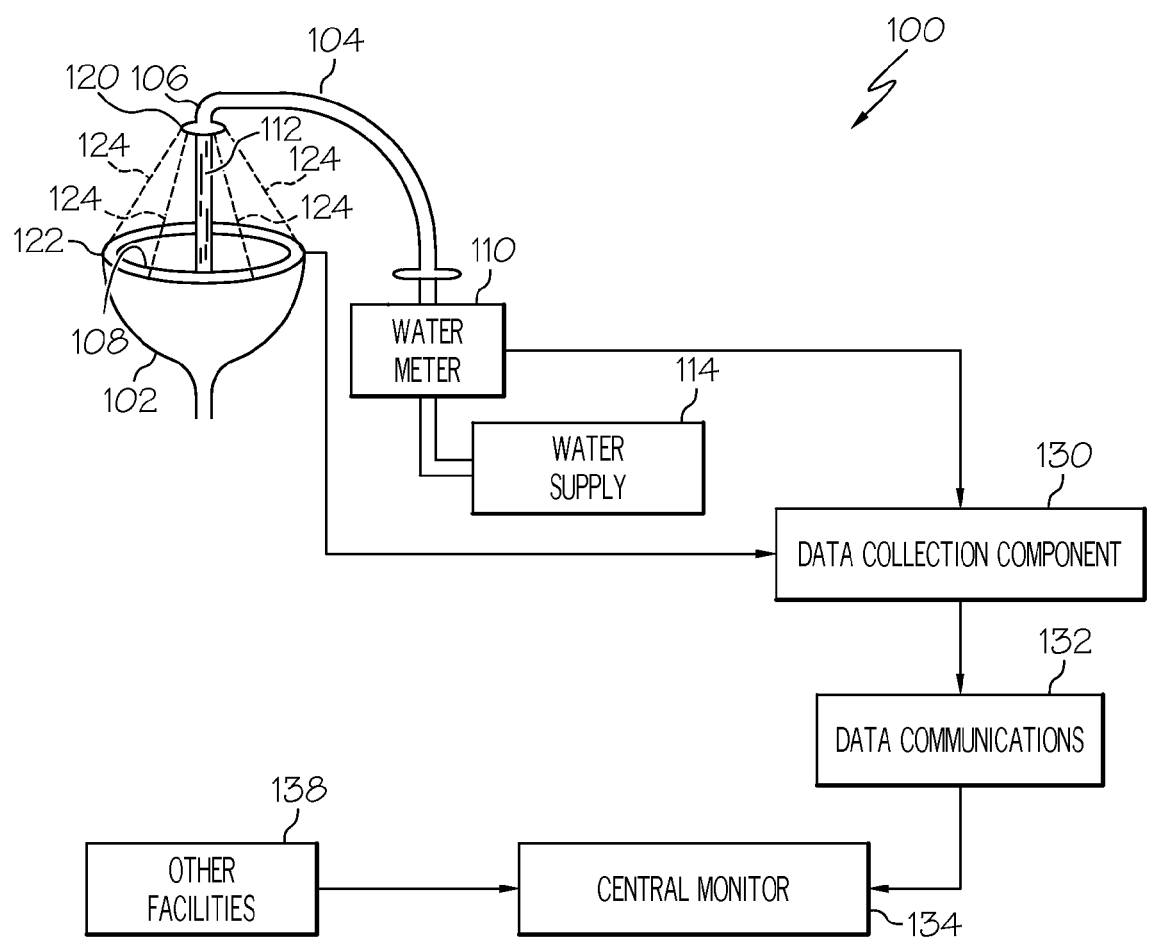
FIG. 1 illustrates a water utilization monitor apparatus in accordance with one example.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The following disclosure describes a system and method for monitoring utilization of a natural resource, such as water. As one example, an optical water utilization monitor for use in a basin is disclosed. In one example, the optical water utilization monitor is based on an optical sensor system that establishes a light beam, such as is generated by a laser or other source, between the outward boundary of a faucet head and a surface of the basin. If a hand, or any other type of object, enters the basin, it disrupts the light beam as detected by optical signal receivers at the edge of the basin. If no object has entered the basin, the monitor assumes the water flowing into the basin is wasted. The apparatus includes a component to measure the amount of water that flows into the basin. When water flows into the basin and an object is detected to have entered the basin, the water is classified as utilized. When water flows into the basin without an object having been detected in the basin, the water is classified as unused or wasted. The ratio of used water to the total amount of water consumed by the basin is used as a percentage of water utilization by the basin. A ratio of used water to unused or wasted water is also able to be determined and analyzed. This data is able to be accumulated and sent to a central monitoring system to assemble water usage and wastage statistics.

Examples of the apparatus described below combine water consumption measurements with detection of water utilization. Enhanced water utilization statistics are available through the use of the described apparatus and method by dividing measured water consumption quantities into quantities of water that were put to a useful purpose and quantities of water that were wasted or not utilized. Accumulation of such water utilization and wastage statistics allows, for example, accurate evaluation of water conservation measures and incentives.

Existing equipment designs serve to detect when an object is in a basin only for the purposes of activating water flow when an object is detected in the basin. The detection techniques used by these designs are not foolproof and often do not detect the presence of an object in the basin. In such applications, the user is motivated to start the water flow and will move his or her hands or other objects until the object's detection is successful and water flows. Should water stop flowing, the user will continue moving objects until the flow starts again. Water utilization measuring applications generally do not provide immediate feedback to a user or provide the user with an incentive to have water utilization accurately detected. Accurate detection of objects in a basin in which water is flowing is required in order to accurately determine if water is being utilized or wasted. The following disclosure presents an effective object detection mechanism that detects a disturbance of an optical signal across an entire opening of a basin.

FIG. 1 illustrates a water utilization monitor apparatus 100 in accordance with one example. The water utilization monitor apparatus 100 is an example of a facility that consumes water and includes equipment and processing to determine amounts of consumed water that is put to a useful purpose and amounts of consumed water that is wasted or unutilized, i.e., water not put to a useful purpose. The water utilization monitor apparatus 100 includes a basin 102, such as a sink, wash tub, bath tub, or any other basin into which water flows and is consumed. The basin 102 has an opening 108 that is defined by the surface of the top rim of the basin 102 in this example. Further examples are able to have basins with openings that take the form of any shape formed by surfaces defining any opening on any surface of the basin 102.

Basin 102 has an associated faucet 104 with a discharge port 106 from which a water flow 112 is directed into the basin. In one example, the water flow 112 is in the form of an aerated stream. Further examples include faucets 104 that have discharge ports 106 that form the water flow 112 into any shape, such as a conical spray, a wide area spray, and the like. Additional examples include discharge ports 106 that are able to be changeably configured to change the shape of the water flow 112 into the basin 102.

The faucet 104 further includes an optical signal transmitter 120 that transmits an optical signal 124 across the opening 108. In an example, the optical signal 124 creates a boundary formed by the discharge port 106 of the faucet 104 and the opening 108 of the basin 102. In one example, the optical signal 124 forms a cone from the discharge port 106 of the faucet 104 to the opening 108 formed by the rim of basin 102. In various examples, the faucet 104 is able to be constructed with an integral optical transmitter 120 or an optical transmitter 120 is able to be retrofitted to an existing faucet 104. In an example, an optical transmitter is able to be threaded onto a nozzle forming the discharge port 106 of an existing faucet 104 in a facility.

The opening 108 of one example has an optical signal receiver 122 that extends around the entire surface at the edge of the basin opening 108. The optical signal receiver 122 receives the optical signal 124 along substantially the entire surface of the opening 108 of the basin 102. In various examples, optical signal receivers are able to be located on any surface of the basin 108 and are not restricted to being placed on the edge of the basin. In one example, as described in further detail below, the optical signal receiver 122 consists of a series of light sensors that are located at intervals around the surface of the opening 108 of the basin 102. The light sensors of one example optical signal receiver 122 are separated by distances that are less than the expected size of objects that are to be detected as entering the boundary formed by a discharge port 106 of the faucet 104 and the opening 108 of the basin 102. For example, light sensors are placed around the surface of the opening 108 of the top of the basin 102 and are separated by distances that are less than the minimum size of a hand or arm that is expected to enter the basin 102 to use water in the water flow 112. The optical signal receiver 122 in various examples is able to be constructed as part of a basin 102 or countertop for a basin 102, or an existing basin 102 and/or countertop is able to be retrofitted to include an optical signal receiver 122. Optical signal receivers 122 are able to be retrofitted into existing basins through a variety of techniques such as using adhesives or inserts. Various implementations are able to retrofit an apparatus to perform detecting periods of water usage by retrofitting an apparatus including an optical transmitter 120 and an optical signal receiver 122 to the facility.

Faucet 104 receives water from a water supply 114, such as a city water supply system. The water provided to the faucet 104 is measured by a water meter 110. An example facility includes one basin 102 with a corresponding water meter 110. Other example facilities include multiple basins. In the case of a facility with multiple basins, each basin is able to have an associated water meter in order to determine water consumed by each basin and to determine utilized quantities of water when the water consumed by that basin is being utilized. In various components, the water meter 110 is able to be included in an apparatus located at the discharge port 106 of faucet 104. Such a water meter included in an apparatus located at discharge port 106 is able to be either manufactured as part of the faucet 104 or as part of an apparatus that is retrofitted to an existing faucet 104.

The water utilization monitor apparatus 100 includes a data collection component 130 that receives and collects data indicating water consumption by a facility. The data collection component 130 of one example receives values indicating the measured quantities of water consumed by the faucet 104 and basin 102. The data collection component 130 further detects periods of water usage by receiving an indicator from the optical signal receiver 122 indicating whether or not the water consumed by the facility consisting of the faucet 104 and the basin 102 is being utilized. Water utilization in this context refers to utilization of the water for a useful purpose. In one example, the water discharged by the faucet 104 through discharge port 106 is utilized if an object, such as a user's hand, is inserted into the basin 102. If an object is inserted into the basin 102, it is assumed that the water consumed by the basin 102, e.g., discharged through discharge port 106 into water flow 112, is used to, for example, wash the object or fill the object if the object is a container.

The data collection component 130 monitors water consumption by the faucet 104 and basin 102 by accumulating indications of the quantities of consumed water that are measured by and received from the water meter 110. Water meter 110 measures the quantity of consumed water and delivers indications of the quantity of water consumption to the data collection component 130.

The data collection component 130 further receives indications of detections of water usage by the faucet 104 and basin 102. In one example, the optical signal receiver 122 detects periods of water usage by detecting an object within the boundary formed by the discharge port of the faucet and the opening of the basin 102. In the illustrated example, the optical signal receiver 122 detects entry of an object into the basin by detecting a corresponding disruption in the optical signal 124 by, for example, the object entering the boundary.

The data collection component 130 receives an indication from the optical signal receiver 122 that an object has been detected in the basin 102. When an object's entry into the basin 102 is detected, a period of water usage begins. In this example, the period during which the object is detected to be in the basin 102 is a detected period of water usage. The period of water usage terminates when the object is no longer detected to be in the basin 102. In one example, the period of water usage terminates when no object is detected within the boundary formed by the optical signal 124, such as when the optical signal receiver 122 is no longer detecting a disruption of the optical signal 124.

While the object is detected to be in the basin, the data collection component records the quantity of water consumed by the faucet 104 and basin 102 as a utilized quantity of water. Water consumption measured by water meter 110 during periods of water usage, i.e., during periods when an object is detected to be in the basin, is recorded as utilized quantities of water. In one example, measured quantities of all water consumed during all periods of water usage by basin 102 and faucet 104 are accumulated by the data collection component 130 into a utilized quantity value.

The data collection component 130 monitors water consumption by the basin 102 and faucet 104 at all times, including outside of periods of water usage. Time periods outside of periods of water usage, i.e., periods when an object is not detected to be in the a boundary formed by the discharge port 106 of the faucet 104 and the opening 108 of the basin 102, are periods during none of the periods of water usage. Quantities of water consumed outside of periods of water usage are recorded as an unutilized quantity. All water consumed outside of periods of water usage is recorded and accumulated into the unutilized quantity for the basin 102 and faucet 104. In an alternative example, the data collection component records the total quantity of all water consumed by the facility and determines water utilization ratios based upon the utilized quantity and the total quantity of all water consumed by the basin 102 and faucet 104.

Water utilization data, such as utilized quantity values, unutilized quantity values and total consumption quantity values, are sent from the data collection component 130 to a central monitor 134. The central monitor 134 of various implementations accumulates water utilization and total consumption data and determines statistics and other utilization metrics that are used to support, for example, water conservation program analyses. In one example, a "smart city" that provides a water utilization monitor apparatus 100 to each water using facility maintains a central monitor 134 to collect water utilization data from all facilities such as homes and businesses. The central monitor 134 further receives water utilization data from other facilities 138 to assemble a large base of data to derive and develop water utilization statistics. One example of water utilization statistics includes a ratio of utilized water to unutilized water and monitoring that ratio as, for example, different incentives are provided to users.

Figure 2:
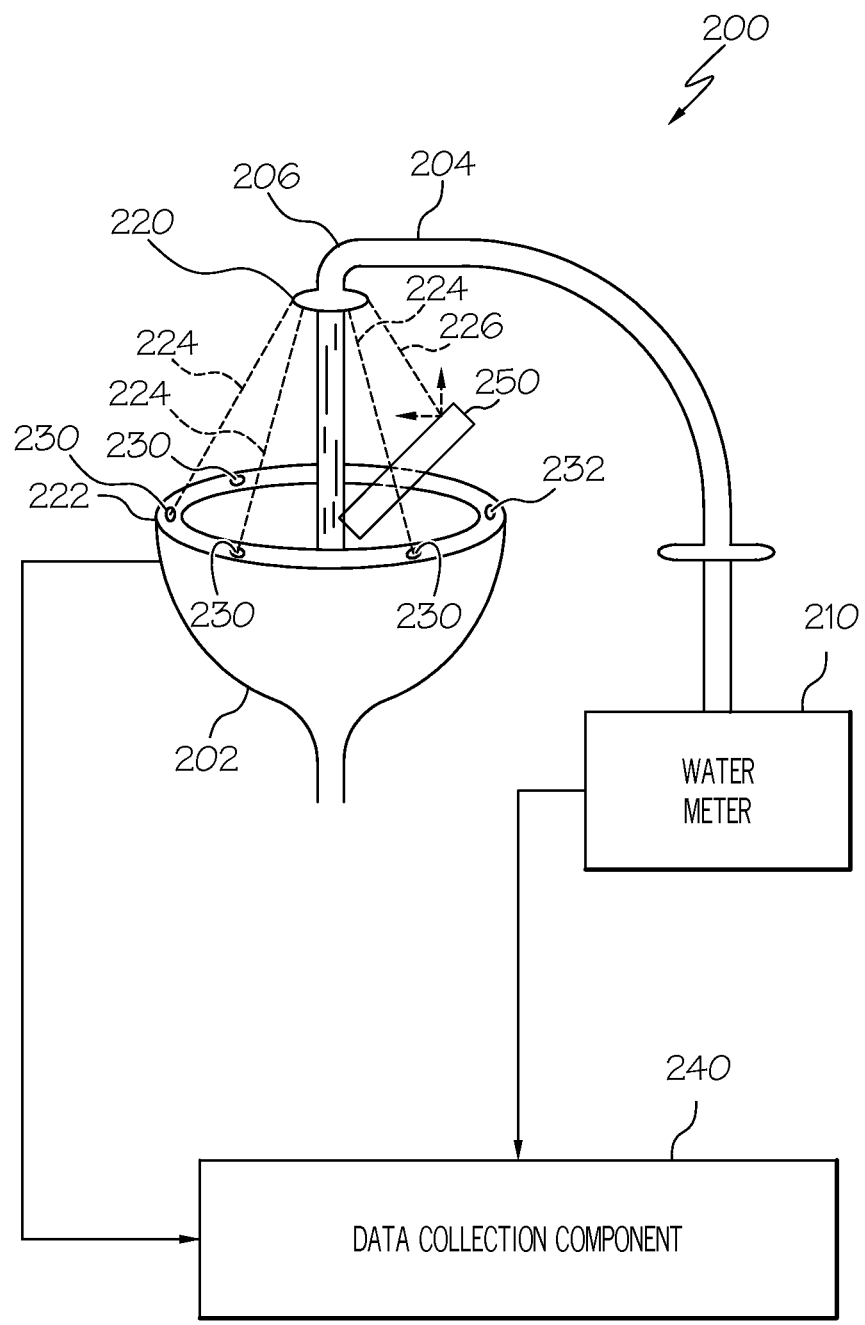
FIG. 2 illustrates a water usage configuration, in accordance with one example.

FIG. 2 illustrates a water usage configuration 200, in accordance with one example. The water usage configuration 200 illustrates a basin 202 and faucet 204 with an optical signal transmitter 220 located near a discharge port 206. The optical signal transmitter 220 transmits an optical signal 224 to a number of optical signal detectors 230 and a first optical signal detector 232 that are located at points around the surface of the opening 208 of the top opening of the basin 202. The assembled number of optical signal detectors 230 and the first optical signal detector 232 form an optical signal receiver 222 similar to the optical signal receiver 122 discussed above. The first optical signal detector 232 is similar to the other optical signal detectors 230 and is depicted separately to facilitate the following discussion regarding the detection of the entry of an object 250 into the boundary formed by the discharge port of the faucet and the opening of the basin. As described above, the optical signal detectors 230 and the first optical signal detector 232 are located at points around the surface of the opening 208 so that objects of at least a minimum expected size that enter the surface of the opening 208 will interfere with at least one optical signal receiver's reception of the optical signal 224. In order to allow a clear depiction of relevant aspects of the illustrated system, the illustrated number optical signal detectors 230 are not as dense as are often deployed around an opening of the basin 202.

The water usage configuration 200 illustrates an object 250 that is inserted into a boundary formed by the discharge port 206 of the faucet 204 and the surface of the opening 208 of the basin 202. Object 250 disrupts the receiving of a portion 226 of the optical signal 224 by the first optical signal detector 232. An indication of a detection of the disruption of the portion 226 of the optical signal 224 by the first optical signal detector 232 is provided by the optical signal receiver 222 to the data collection component 240. In response to the indication of the detected disruption of receiving the optical signal, the data collection component 240 records as a utilized quantity the quantities of water that are measured by water meter 210 as consumed by the facility including the basin 202 and faucet 204. When the object 250 is removed from the boundary formed by the optical signal 224, the disruption of reception of the optical signal 224 ceases. The reception of an undisrupted optical signal 224 by the optical signal receiver 222 is indicated to the data collection component 240. Water consumed by the facility including basin 202 and faucet 204 during periods of undisrupted optical signal reception are marked as utilized.

Figure 3:
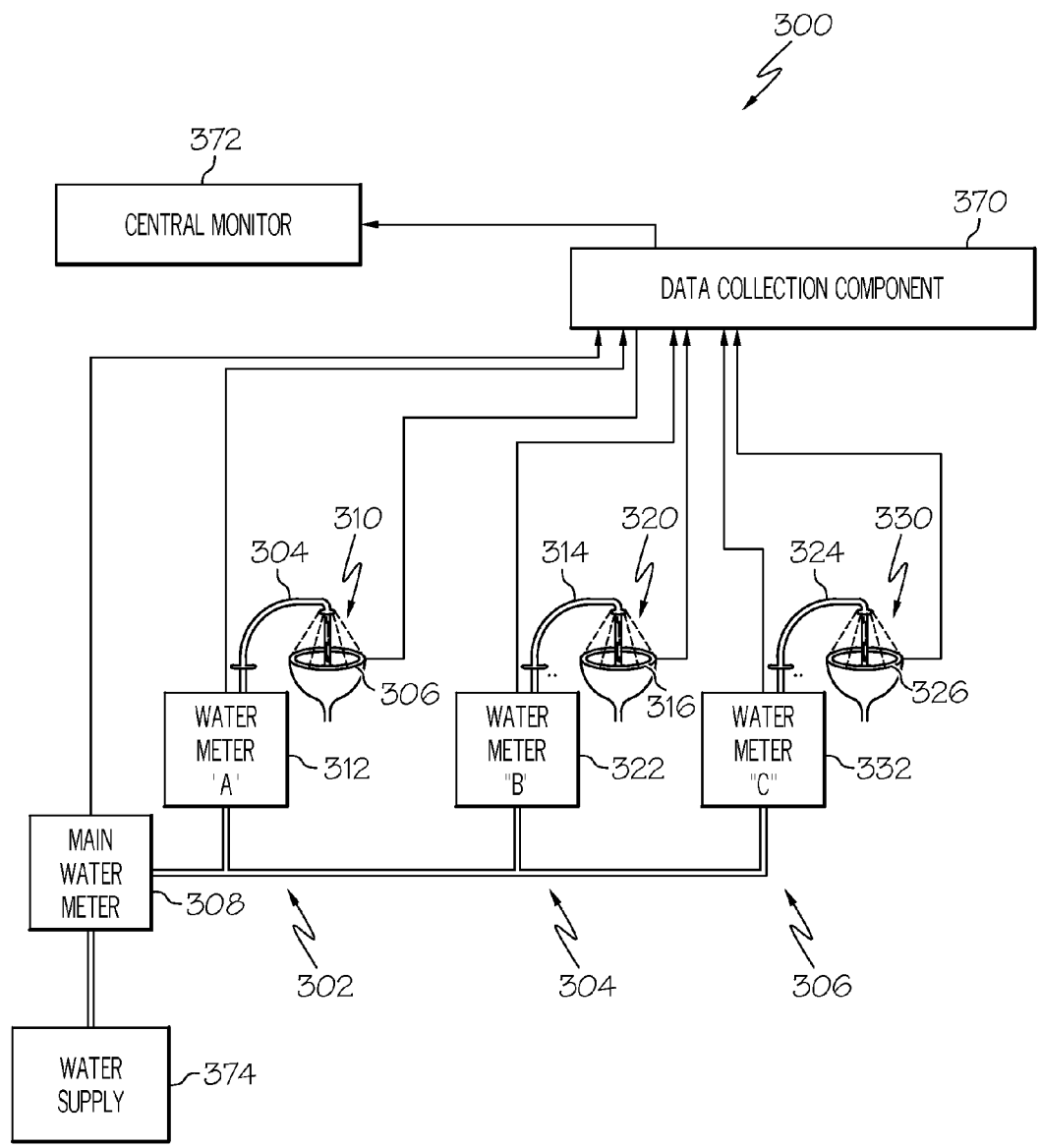
FIG. 3 illustrates a multiple basin facility, in accordance with one example.

FIG. 3 illustrates a multiple basin facility 300, in accordance with one example. The multiple basin facility 300 includes a basin facility "A" 302, a basin facility "B" 312, and a basin facility "Z" 322. In this description, each basin facility includes a basin and an associated respective faucet for that basin. Each basin facility further includes an optical transmitter and an optical signal receiver as is described above with respect to water utilization monitor apparatus 100. The three illustrated basin facilities are representative on any number of basins and associated equipment that are able to be included in a facility. Various facilities that are able to incorporate the disclosed system and methods are able to have from one to any number of basin facilities.

Each basin facility in the multiple basin facility 300 is shown to have a respective opening into which objects enter that basin. For example, basin "A" 310 has an associated opening "A" 306, basin "B" 320 has and is associated with an opening "B" 316, and basin "Z" 330 has and is associated with opening "Z" 326.

Each basin is also associated with at least one faucet that directs a water flow into the basin with which it is associated. For example, basin "A" 310 is associated with a faucet "A" 304, basin "B" 320 is associated with a faucet "B" 314, and basin "Z" 330 is associated with a faucet "Z" 324.

Each basin also has a respective optical signal transmitter and receiver to detect at least one period of water usage by detecting a presence of an object within a boundary formed by a discharge port of one faucet and the opening of the basin with which the one faucet is associated. These optical signal transmitters and receivers operate as described above with regards to water utilization monitor apparatus 100 to detect periods of usage by each basin and reports these periods of usage to a data collection component 370. The data collection component 370 receives indications of detected periods of water usage from the optical signal receivers of each basin.

The water consumption of each basin is measured by a water meter that is associated with that basin. For example, basin "A" 302 is associated with a meter "A" 312, basin "B" 320 is associated with a meter "B" 312, and basin "Z" 330 is associated with a meter "Z" 332.

Each water meter reports water consumption amounts for each respective basin to a data collection component 370. The data collection component 370 marks measured amounts of consumed water for each basin as either "used" or "unused" based upon detected periods of water usage for each basin. In one example, periods of water usage are detected by optical signal receivers for each basin and an indication is sent to the data collection component 370. In response to the indication of a period of water usage, the data collection component 370 marks as "used" water that was consumed by that basin during the detected period of water usage. Water consumption marked as "used" is accumulated into a utilized quantity value. Water consumption marked as "unused" is accumulated into an unutilized quantity value. Other examples record and accumulate utilized quantity values and total consumption quantity values to support usage analyses. Some examples include a multiple basin water meter 308 that measures the total amount of water consumed by the multiple basin facility 300.

The data collection component 370 of one embodiment communicates utilized quantity values, unutilized quantity values, and total consumption quantity values to a central monitor system 372, in a manner similar to that discussed above.

Figure 4:
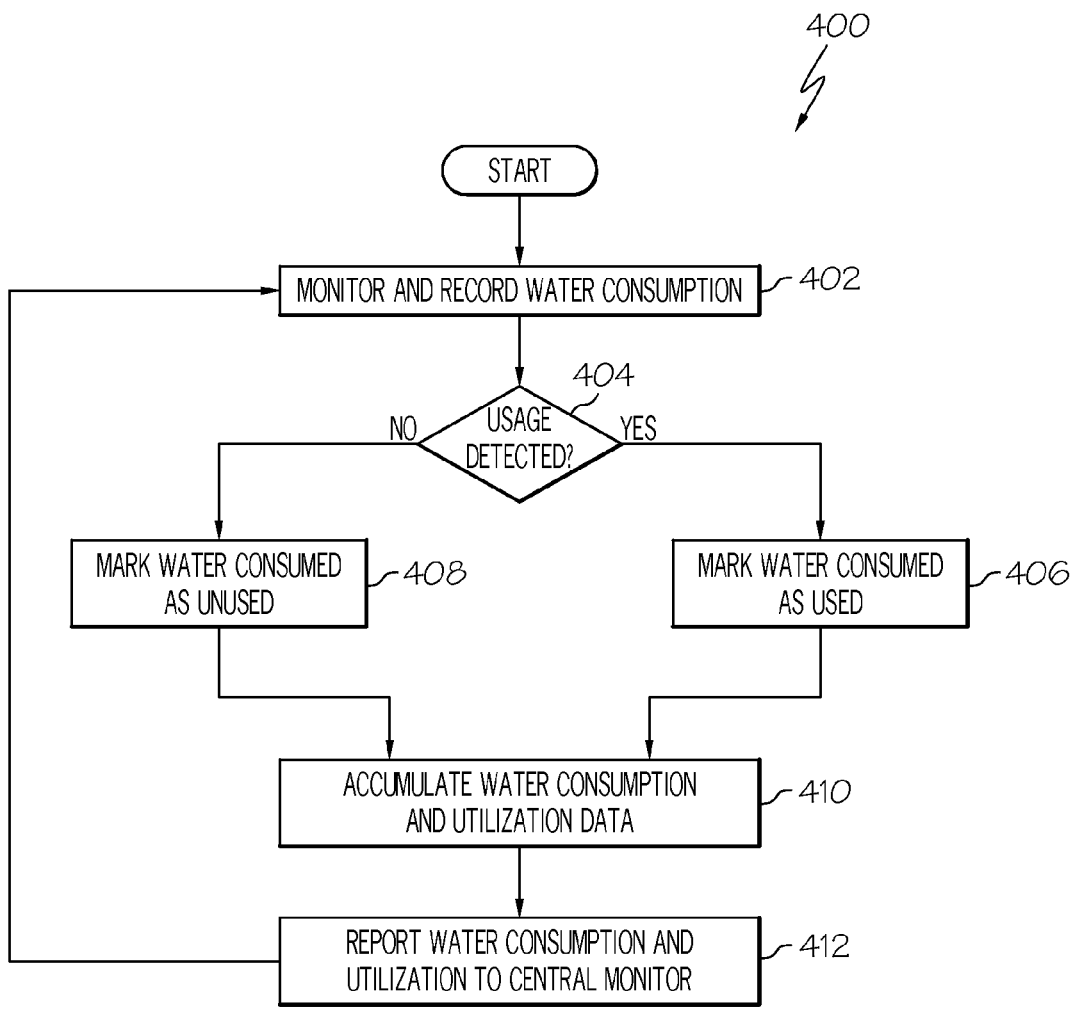
FIG. 4 illustrates a water utilization monitoring process, in accordance with one example.

FIG. 4 illustrates a water utilization monitoring process 400, in accordance with one example. The water utilization monitoring process 400 begins by monitoring and recording, at 402, water consumption by at least one facility. A facility in this context refers to one or more of a single basin with a water faucet, a building, or multiple buildings that have a number of basins and various techniques for directing a flow of water into those basins, and the like. Water consumption is able to be measured by, for example, a water meter associated with each basin or other water consumption devices.

The water utilization monitoring process 400 continues by detecting, at 404, usage of water that is being consumed by a basin that is a facility or that is part of a facility. Usage of water by the basin is defined in this context as utilizing the water consumed by the basin for a useful purpose.

If there was not detected a usage of water being consumed by the basin, the water utilization monitoring process 400 proceeds by marking, at 408, water consumed by the basin as being unused. If there was detected a usage of water being consumed by the basin, the water utilization monitoring process 400 proceeds by marking, at 406, water consumed by the basin as being used.

The water utilization monitoring process 400 proceeds to accumulate, at 410, water consumption and utilization data. The accumulated water consumption and utilization data is able to include, for example, the quantities of water consumption that were marked as used and unused. Total water consumption is also able to be accumulated. The accumulated water consumption and utilization data are then reported, at 412, to a central monitor system in a manner similar to that discussed above. The processing then returns to monitoring and recording, at 402, the water consumption by the facility.

Information Processing System

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
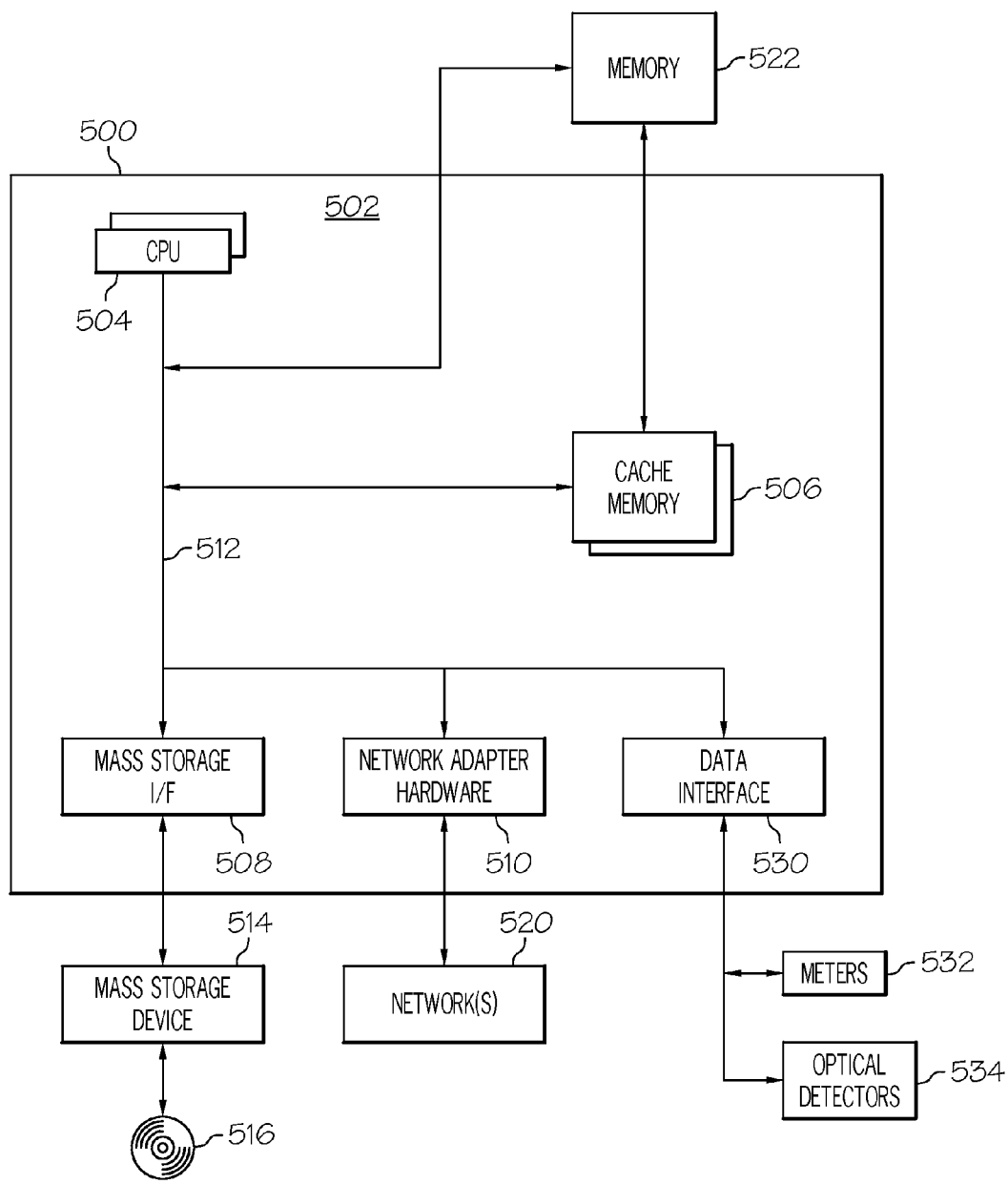
FIG. 5 is a block diagram illustrating an information processing system according to one embodiment of the present invention.

Referring now to FIG. 5, which is a block diagram illustrating an information processing system 500 that can be utilized in conjunction with water utilization monitor apparatus 100 discussed above with respect to FIG. 1. Uses of the information processing system 500 include, for example, the data collection component 130 and the central monitor 132. The information processing system 500 is based upon a suitably configured processing system adapted to implement one or more embodiments of the present invention. Similarly, any suitably configured processing system can be used as the information processing system 500 by embodiments of the present invention.

The information processing system 500 includes a computer 502. The computer 502 has one or more instruction processor(s) 504 that are connected to a cache memory 506, memory 522, mass storage interface 508, and network adapter hardware 510. A system bus 512 interconnects these system components.

The mass storage interface 508 is used to connect mass storage devices, such as data storage device 514, to the information processing system 500. One specific type of data storage device is an optical drive such as a CD/DVD drive, which may be used to store data to and read data from a computer readable medium or storage product such as (but not limited to) a CD/DVD 516. Another type of data storage device is a data storage device configured to support, for example, NTFS type file system operations.

An operating system (not shown) included in the memory 522 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 500. The network adapter hardware 510 in one embodiment provides network communications interfaces to one or more networks 520. Embodiments of the present invention are able to be adapted to work with any data communications connections including present day analog and/or digital techniques or via a future networking mechanism. Networks 420 are able to connect, for example, various data collection components 130 to a central monitor 132.

A data interface 530 is used to exchange data with data collection systems such as meters 432 and optical detectors 434. Meters 432 include, for example, water meter 110 discussed above. Optical detectors 434 include, for example, the optical signal receiver 122 also discussed above.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for monitoring natural resource utilization, the method comprising:
performing the following with a processor:
receiving, from a water meter, data indicating water consumption by a facility, wherein the facility comprises a faucet and an associated basin, wherein:
the associated basin comprises an opening into which objects enter the basin, and
the faucet comprises a discharge port from which a water flow is directed into the associated basin through the opening;
measuring quantities of water consumed by the facility;
detecting at least one period of time during which an object is anywhere within a boundary formed by a discharge port of the faucet and the opening of the basin;
recording, as a utilized quantity, quantities of water measured during the at least one period of time during which the object is anywhere within the boundary; and
recording, as an unutilized quantity, quantities of water that are measured at all times outside of the at least one period during which an object is anywhere within the boundary.

2. The method of claim 1, wherein the detecting the at least one period of time during which the object is anywhere within the basin comprises:
transmitting an optical signal across the boundary;
receiving the optical signal at a receiver located in proximity to the opening, the receiver being disposed to detect the optical signal along substantially an entirety of the opening; and
detecting a disruption of receiving the optical signal at any point along the opening.

3. The method of claim 2, wherein the transmitting comprises transmitting the optical signal from at least one location proximate to the discharge port.

4. The method of claim 2, wherein the receiver is located at the opening, and the receiver comprising a plurality of sensors that are disposed along substantially an entirety of the opening.

5. The method of claim 4,
wherein the object is within a set of objects, each object within the set of objects having a minimum dimension,
wherein the detecting the disruption comprises detecting a disruption of the receiving optical signal by object having at least the minimum size, and
wherein sensors within the plurality of sensors are separated by distances less than the minimum dimension.

6. The method of claim 1, further comprising:
sending, to a remote data accumulation center, a value representing the utilized quantity and the utilized quantity value; and sending, to a remote data accumulation center, a value representing the unutilized quantity and the utilized quantity value.

7. The method of claim 1, further comprising:
recording a consumed water quantity value corresponding to the water consumption by the facility, and
sending, to a remote data accumulation center, a value representing the utilized quantity and the consumed water quantity value.

8. The method of claim 1,
wherein the facility comprises a set of basins and at least one faucet, wherein each basin within the set of basins is associated with a respective faucet,
wherein each basin within the set of basins comprises a respective opening into which objects enter that basin,
wherein each associated respective faucet comprises a discharge port through which a water flow is directed into the basin with which it is associated,
wherein detecting at least one period of water usage comprises receiving an indication of a detection of an object within a boundary formed by a discharge port of one faucet within the at least one faucet and the opening of the basin with which the one faucet is associated,
the method further comprising recording a consumed water quantity value corresponding to a quantity of water flowing into the basin with which the one faucet is associated, and
sending, to a remote data accumulation center, a value representing the utilized quantity and the consumed water quantity value.

9. A system for monitoring natural resource utilization, the system comprising:
a memory;
a processor communicatively coupled to the memory, wherein the processor comprises:
an instruction processor configured to:
receive, from a water meter, data indicating water consumption by a facility, the facility comprises a faucet and an associated basin; wherein
the faucet comprises a discharge port from which a water flow is directed into the basin through an opening, and
the associated basin comprises the opening into which objects enter the basin;
determine measured quantities of water consumed by the facility;
detect at least one period of time during which an object is anywhere within a boundary formed by a discharge port of the faucet and the opening of the associated basin;
record, as a utilized quantity, quantities of water measured during the at least one period of time during which the object is anywhere within the boundary; and
record, as an unutilized quantity, measured quantities of water that are measured at all times outside of the at least one period during which an object is anywhere within the boundary.

10. The system of claim 9, further comprising an object detector configured to detect the at least one period of time during which the object is anywhere within the associated basin, the object detector comprising:
an optical signal transmitter configured to transmit an optical signal across the boundary;
an optical signal receiver located in proximity to the opening and disposed to detect the optical signal along substantially an entirety of the opening, the optical signal receiver configured to:
receive the optical signal along substantially an entirety of the opening;
detect a disruption of receiving the optical signal at any point along the opening; and
send the indication of the detection of the object.

11. The system of claim 9, the optical signal transmitter configured to transmit the optical signal from at least one location proximate to the discharge port.

12. The system of claim 9, further comprising the water meter configured to measure water consumption by the facility, the water meter sending the data indicating water consumption by the facility, the water meter being located at the discharge port of the faucet.

13. The system of claim 9, the instruction processor further:
records a consumed water quantity value corresponding to the water consumption by the facility, and
sends, to a remote data accumulation center, a value representing the utilized quantity and the consumed water quantity value.

14. The system of claim 9,
wherein the facility comprises a set of basins and at least one faucet, wherein each basin within the set of basins is associated with a respective faucet,
wherein each basin within the set of basins comprises a respective opening into which objects enter that basin,
each associated respective faucet comprising a discharge port through which a water flow is directed into the basin with which it is associated,
wherein the instruction processor is further configured to:
detect at least one period of water usage by receiving an indication of a detection of an object within a boundary formed by a discharge port of one faucet within the at least one faucet and the opening of the basin with which the one faucet is associated,
record a consumed water quantity value corresponding to a quantity of water flowing into the basin with which the one faucet is associated, and
send, to a remote data accumulation center, a value representing the utilized quantity and the consumed water quantity value.

15. A computer program product for monitoring natural resource, the computer program product comprising:
a non-transitory storage medium readable by a processing circuit and storing instructions for execution by the processing circuit for performing a method comprising:
receiving, from a water meter, data indicating water consumption by a facility, wherein the facility comprises a faucet and an associated basin, wherein:

the associated basin comprises an opening into which objects enter the basin, and the faucet comprises a discharge port from which a water flow is directed into the associated basin through the opening;

measuring quantities of water consumed by the facility;

detecting at least one period of time during which an object is anywhere within a boundary formed by a discharge port of the faucet and the opening of the basin;

recording, as a utilized quantity, quantities of water measured during the at least one period of time during which the object is anywhere within the boundary; and recording, as an unutilized quantity, quantities of water that are measured at all times outside of the at least one period during which an object is anywhere within the boundary.

16. The computer program product of claim 15, the method further comprising:

recording a consumed water quantity value corresponding to the water consumption by the facility, and sending, to a remote data accumulation center, a value representing the utilized quantity and the consumed water quantity value.

17. The computer program product of claim 15, the method further comprising:

wherein the facility comprises a set of basins and at least one faucet, wherein each basin within the set of basins being associated with a respective faucet, wherein each basin within the set of basins comprises a respective opening into which objects enter that basin, each associated respective faucet comprising a discharge port through which a water flow is directed into the basin with which it is associated, wherein detecting at least one period of water usage comprises receiving an indication of a detection of an object within a boundary formed by a discharge port of one faucet within the at least one faucet and the opening of the basin with which the one faucet is associated, the method further comprising recording a consumed water quantity value corresponding to a quantity of water flowing into the basin with which the one faucet is associated, and sending, to a remote data accumulation center, a value representing the utilized quantity and the consumed water quantity value.

\* \* \* \* \*